United States Patent
Li et al.

(10) Patent No.: US 8,587,216 B2
(45) Date of Patent: Nov. 19, 2013

(54) CONSTANT CURRENT DC-DC CONVERTER

(75) Inventors: Guojun Li, Shenzhen (CN); Wei Song, Shenzhen (CN)

(73) Assignee: STMicroelectronics (Shenzhen) R&D Co., Ltd., Shenzhen (CN)

( * ) Notice: Subject to any disclaimer, the term of this patent is extended or adjusted under 35 U.S.C. 154(b) by 0 days.

(21) Appl. No.: 13/300,219

(22) Filed: Nov. 18, 2011
(Under 37 CFR 1.47)

(65) Prior Publication Data
US 2013/0141006 A1    Jun. 6, 2013

(30) Foreign Application Priority Data
Nov. 19, 2010    (CN) .......................... 2010 1 0556281

(51) Int. Cl.
*H05B 37/02*    (2006.01)
(52) U.S. Cl.
USPC .......................................... 315/291; 315/307
(58) Field of Classification Search
USPC ................................ 326/291, 297, 307–309
See application file for complete search history.

(56) References Cited

U.S. PATENT DOCUMENTS

| | | | |
|---|---|---|---|
| 7,705,541 B2 * | 4/2010 | Watanabe et al. | 315/150 |
| 8,471,497 B2 * | 6/2013 | Ruan et al. | 315/307 |
| 2010/0102756 A1 * | 4/2010 | Shin et al. | 315/297 |
| 2011/0121755 A1 * | 5/2011 | Han | 315/294 |
| 2013/0134889 A1 * | 5/2013 | Chen et al. | 315/193 |

* cited by examiner

*Primary Examiner* — Don Le
(74) *Attorney, Agent, or Firm* — Slater & Matsil, L.L.P.

(57) ABSTRACT

A device includes a positive power supply voltage node; and a first operational amplifier including a first input, a second input, and an output coupled to the second input. The device further includes a first resistor coupled between the second input of the first operational amplifier and the positive power supply voltage node; a second resistor coupled between the output of the first operational amplifier and an electrical ground, and is configured to receive a same current flowing through the first resistor; a second operational amplifier including a first input coupled to the second resistor, and an output coupled to an output node; and a third resistor coupled between the electrical ground and a second input of the second operational amplifier.

20 Claims, 2 Drawing Sheets

CONSTANT CURRENT DC-DC CONVERTER

CROSS-REFERENCE TO RELATED APPLICATIONS

This application claims the priority benefit of Chinese patent application number 201010556281.0, filed on Nov. 19, 2010, which is hereby incorporated by reference to the maximum extent allowable by law.

TECHNICAL FIELD

This application relates generally to integrated circuits, and more particularly to constant current DC-DC converters for generating low quiescent and highly accurate currents.

BACKGROUND

In certain applications, such as light-emitting device (LED) related applications, highly stable and accurate currents are needed. For example, LEDs need highly accurate currents so that the brightness of the LEDs may be accurately controlled. DC-DC converters were commonly used in integrated circuits for providing the accurate currents. In the DC-DC converters, reference voltages free from temperature variations, voltage variations, and process variations are generated, and are then converted to currents, which will also be highly accurate and stable.

SUMMARY

In accordance with one embodiment, a device includes a positive power supply voltage node; and a first operational amplifier including a first input, a second input, and an output coupled to the second input. The device further includes a first resistor coupled between the second input of the first operational amplifier and the positive power supply voltage node; a second resistor coupled between the output of the first operational amplifier and an electrical ground, and is configured to receive a same current flowing through the first resistor; a second operational amplifier including a first input coupled to the second resistor, and an output coupled to an output node; and a third resistor coupled between the electrical ground and a second input of the second operational amplifier.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The specific embodiments discussed are merely illustrative, and do not limit the scope of the disclosure.

Figure 1:
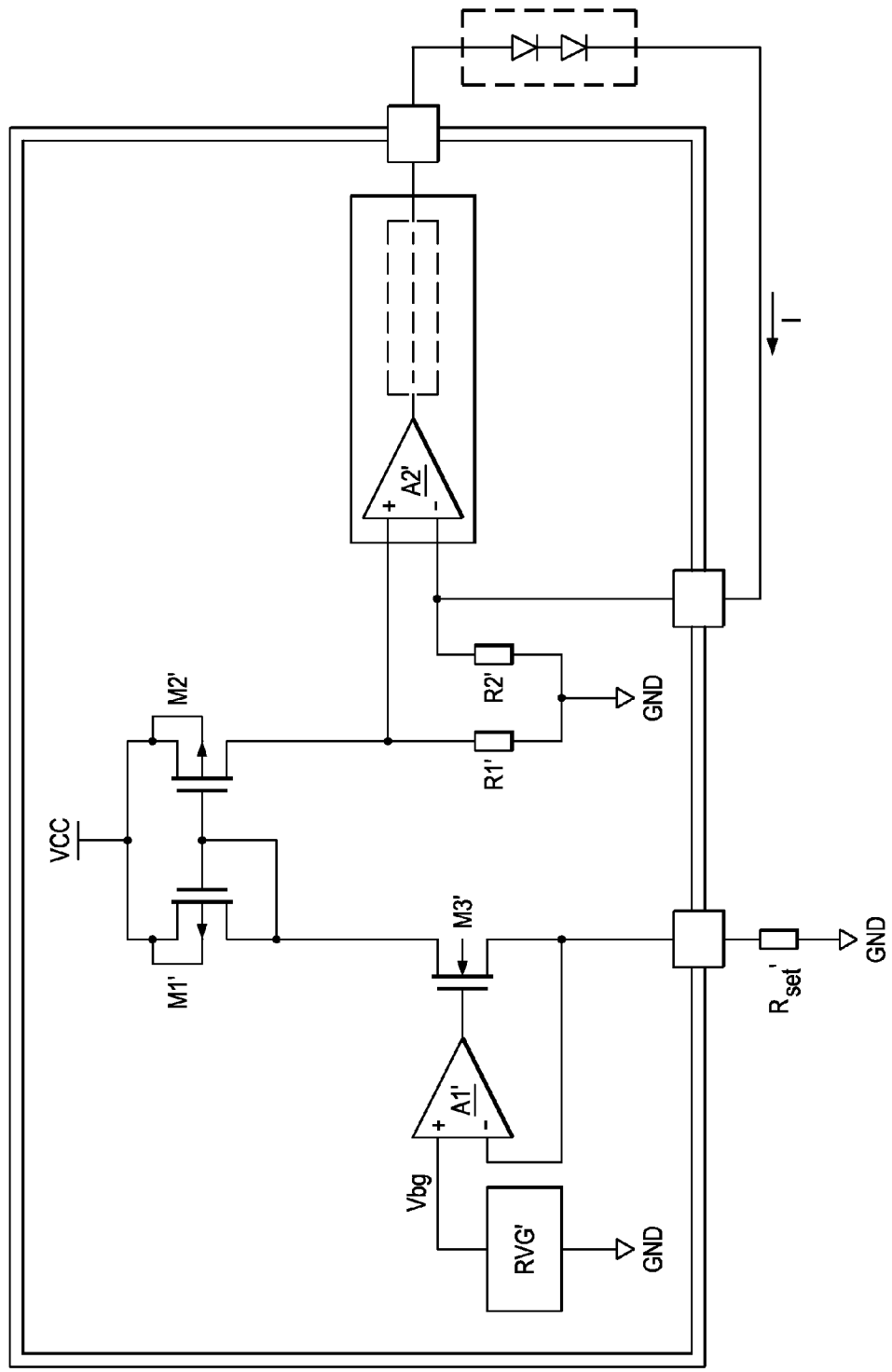
FIG. 1 illustrates a DC-DC converter for providing a stable output current, wherein a current mirror is used.

FIG. 1 illustrates a DC-DC converter, which includes a bandgap reference generator RVG' generating output voltage Vbg. Output voltage Vbg is provided to a positive input of operational amplifier A1'. The negative input of amplifier A1' is coupled to a source of transistor M3', and is further coupled to electrical ground GND through resistor Rset'. A current mirror formed of transistors M1' and M2' comprises a first arm (the arm with transistor M1') coupled to the drain of transistor M3', and a second arm (the art with transistor M2') coupled to resistor R1'. Operational amplifier A2' includes a positive input coupled to the second arm of the current mirror, and a negative input coupled to electrical ground GND through resistor R2'.

The circuit shown in FIG. 1 can generate stable output current I, which can be expressed as:

$$I = n1 * n2 * Vbg / Rset' \quad [\text{Eq. 1}]$$

Wherein n1 is the ratio of the drive current of transistor M2' to the drive current of transistor M1', n2 is the ratio of the resistance of resistor R1' to the resistance of resistor R2'. It is observed that output current I is affected by ratio n1, which is further affect by process and temperature variations of transistors M1' and M2'. Further, there are currents flowing through the current mirror, which currents are wasted. Accordingly, an improved constant current DC-DC converter is provided in accordance with an embodiment, as is illustrated in FIG. 2.

Figure 2:
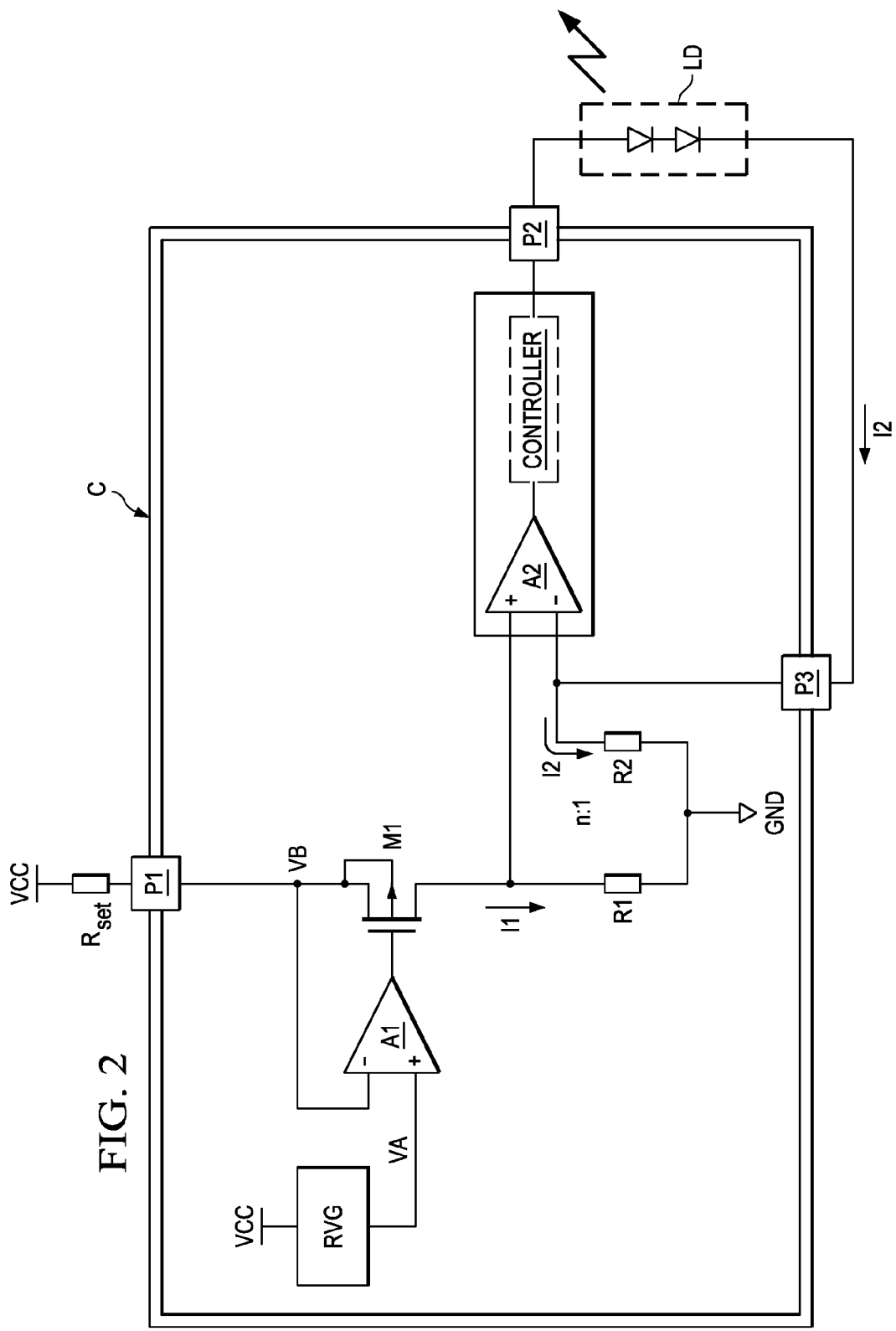
FIG. 2 illustrates a DC-DC converter for providing a stable output current in accordance with embodiments, wherein no current mirror is used.

FIG. 2 illustrates a circuit diagram of a constant current DC-DC converter for converting a DC reference voltage, which is generated by a reference voltage generator, to a DC current. The constant current DC-DC converter includes reference voltage generator RVG for generating stable reference voltage VA. In an embodiment, reference voltage generator RVG is a bandgap reference voltage generator. Reference voltage VA is provided to a positive input of operational amplifier A1. The negative input of operational amplifier A1 is coupled to a drain of transistor M1, which drain is further coupled to positive power supply voltage VCC through resistor Rset. Positive power supply voltage VCC is further provided by a power supply source (not shown). In an embodiment, the constant current DC-DC converter is formed in chip C, and the drain of transistor M1 is coupled to an external pad or pin (referred to as pad/pin hereinafter) P1 of chip C. Resistor Rset may be external to chip C, although it may also be built inside chip C.

The source of transistor M1 is coupled to electrical ground GND (or VSS) through resistor R1. Further, the source of transistor M1 is coupled to the positive input of operational amplifier A2. Transistor M1 is used to reduce the output impedance of operational amplifier A1, and to improve the driving capability of operational amplifier A1 to ensure that voltage VB at the drain of transistor M1 is equal to voltage VA. The negative input of operational amplifier A2 is also coupled to electrical ground GND (or VSS) through resistor R2. The resistances of resistors R1 and R2 are also denoted using reference notations R1 and R2, respectively. In an embodiment, resistance R1 is equal to R2. In alternative embodiments, ratio n (R1/R2) is not equal to 1, and can be selected accordingly to the application in which the constant current DC-DC converter is to be used. The negative input of operational amplifier A2 may be coupled to external pad/pin P3 of chip C.

In an embodiment, the output of operational amplifier A2 is directly connected to output node P2, which may also be an external pad/pin of the respective chip C. In alternative embodiments, a controller circuit may be added between the output of operational amplifier A2 and output node P2 to moderate output current I2. Output node P2 may be coupled to load device LD, which may be a light-emitting device(s) (LED) or any other type of loading devices. Further, load device LD is coupled between the negative input of operational amplifier A2 and output node P2. Load device LD may be a device external to chip C.

Due to the virtual connection between the positive input and the negative input of operational amplifier A1, voltage VB at the drain of transistor M1 is equal to reference voltage VA, which is generated by reference voltage generator RVG. Accordingly, current I1 that flows through the source-drain path of transistor M1 may be expressed as:

$$I1=(VCC-VA)/Rset \qquad [\text{Eq. 1}]$$

Due to the virtual connection between the positive input and the negative input of operational amplifier A2, the voltages on the positive input and the negative input of operational amplifier A2 are at the same level, and hence current I2 can be expressed as:

$$I2=n*I1=n*(VCC-VA)/Rset \qquad [\text{Eq. 2}]$$

Through Equation 2, it is observed that current I2 is stable and accurate since ratio n, power supply voltage VCC, reference voltage VA, and resistance Rset are stable and accurate. Further, output current I2 may be easily adjusted by adjusting resistance Rset since ratio n, power supply voltage VCC, and reference voltage VA are constant. Chip C may thus be used as an LED control chip.

In the embodiments, since no current mirror is used, the current consumed by the current mirror is saved, and the variation and mismatch caused by the current mirror is eliminated.

Although the example embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention.

What is claimed is:

1. A device comprising:
 a positive power supply voltage node;
 a first operational amplifier comprising a first input, a second input, and an output coupled to the second input;
 a first resistor coupled between the second input of the first operational amplifier and the positive power supply voltage node;
 a second resistor coupled between the output of the first operational amplifier and an electrical ground, and configured to receive a same current flowing through the first resistor;
 a second operational amplifier comprising a first input coupled to the second resistor, and an output coupled to an output node; and
 a third resistor coupled between the electrical ground and a second input of the second operational amplifier.

2. The device of claim 1 further comprising a bandgap reference voltage generator comprising an output coupled to the first input of the first operational amplifier.

3. The device of claim 1, wherein the first and the second operational amplifiers are in a chip, and wherein each of the second input and the output of the second operational amplifier is coupled to an external pad/pin of the chip.

4. The device of claim 3, wherein the second input of the first operational amplifier is coupled to an additional external pad/pin of the chip.

5. The device of claim 1 further comprising a load device external to the chip and coupled between the external pad/pin and the additional external pad/pin of the chip.

6. The device of claim 1 further comprising a light-emitting device (LED) coupled between the second input and the output of the second operational amplifier.

7. The device of claim 1 further comprising a transistor comprising a gate coupled to the output of the first operational amplifier, a first source/drain coupled to the second input of the first operational amplifier, and a second source/drain coupled to the second resistor.

8. The device of claim 7, wherein the second source/drain is connected to the second resistor and the first input of the second operational amplifier directly.

9. A device comprising:
 a positive power supply voltage node;
 a bandgap reference voltage generator comprising an output for outputting a reference voltage;
 a first operational amplifier comprising a first input coupled to the output of the bandgap reference voltage generator, a second input, and an output;
 a transistor comprising a gate coupled to the output of the first operational amplifier;
 a first resistor comprising a first end coupled to the positive power supply voltage node, and a second end coupled to the second input of the first operational amplifier and a first source/drain of the transistor;
 a second resistor coupling a second source/drain of the transistor to an electrical ground;
 a second operational amplifier comprising a first input coupled to the second source/drain of the transistor, and an output coupled to an output node;
 a third resistor coupling to a second input of the second operational amplifier to the electrical ground; and
 a load device coupled between the output node and the second input of the second operational amplifier, wherein the device is configured to allow a current flowing through the load device equal to a current flowing through the third resistor.

10. The device of claim 9, wherein the first and the second operational amplifiers are in a chip, and wherein each of the second input and the output of the second operational amplifier is coupled to an external pad/pin of the chip.

11. The device of claim 10, wherein the second input of the first operational amplifier is coupled to an additional external pad/pin of the chip.

12. The device of claim 9, wherein the load device comprises a light-emitting device (LED).

13. The device of claim 9, wherein the first inputs of the first and the second operational amplifiers are positive inputs, and the second inputs of the first and the second operational amplifiers are negative inputs.

14. The device of claim 9, wherein the second source/drain of the transistor is connected to the second resistor and the first input of the second operational amplifier directly.

15. A method of generating a current, the method comprising:
 generating a reference voltage using a bandgap reference voltage generator;
 applying the reference voltage on a first input of a first operational amplifier to map the reference voltage to a second input of the first operational amplifier;

generating a first current flowing through a first resistor using the reference voltage, wherein the first resistor is coupled to the second input of the first operational amplifier;

applying the first current on a second resistor, wherein the second resistor is coupled between a first input of a second operational amplifier and an electrical ground; and generating a second current flowing through a third resistor, wherein the third resistor is coupled between a second input of the second operational amplifier and the electrical ground.

16. The method of claim 15, wherein the first and the second operational amplifiers and the second and the third resistors are inside a chip, wherein the method further comprises connecting a load device to the chip, with the load device being external to the chip, and wherein the second current flows through the load device.

17. The method of claim 16, wherein the load device is coupled between an output of the second operational amplifier and the second input of the second operational amplifier.

18. The method of claim 15, wherein the first and the second operational amplifiers and the second and the third resistors are inside a chip, and wherein the method further comprises connecting the first resistor to the second input of the first operational amplifier, with the first resistor being external to the chip.

19. The method of claim 15, wherein the step of generating the first current comprises applying a positive power supply voltage and the reference voltage onto opposite ends of the first resistor.

20. The method of claim 15, wherein the second resistor is directly connected to the first input of the second operational amplifier.

* * * * *